(12) United States Patent
Biggs

(10) Patent No.: US 8,413,167 B2
(45) Date of Patent: Apr. 2, 2013

(54) NOTIFYING A USER OF ACCESS TO INFORMATION BY AN APPLICATION

(75) Inventor: Todd S. Biggs, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1187 days.

(21) Appl. No.: 11/865,678

(22) Filed: Oct. 1, 2007

(65) Prior Publication Data

US 2009/0089803 A1 Apr. 2, 2009

(51) Int. Cl.
*G06F 3/00* (2006.01)
*G06F 9/44* (2006.01)
*G06F 9/46* (2006.01)
*G06F 13/00* (2006.01)

(52) U.S. Cl. .......................................... 719/318; 726/26
(58) Field of Classification Search .................. 719/318; 726/26
See application file for complete search history.

(56) References Cited

U.S. PATENT DOCUMENTS

| | | | |
|---|---|---|---|
| 6,253,202 B1 * | 6/2001 | Gilmour ............................... | 1/1 |
| 6,633,910 B1 | 10/2003 | Rajan et al. | |
| 7,028,052 B2 * | 4/2006 | Chapman et al. ..................... | 1/1 |
| 7,085,834 B2 | 8/2006 | Delany et al. | |
| 7,203,752 B2 * | 4/2007 | Rice et al. ...................... | 709/225 |
| 7,542,993 B2 * | 6/2009 | Satterfield et al. ..................... | 1/1 |
| 7,668,535 B2 * | 2/2010 | Conneely et al. .......... | 455/412.2 |
| 7,899,469 B2 * | 3/2011 | Casey ......................... | 455/456.3 |
| 8,280,359 B2 * | 10/2012 | Moshir et al. .............. | 455/414.3 |
| 2004/0034799 A1 * | 2/2004 | Mikami ........................ | 713/201 |
| 2005/0097173 A1 | 5/2005 | Johns et al. | |
| 2005/0160167 A1 | 7/2005 | Cheng et al. | |
| 2005/0216529 A1 | 9/2005 | Ashtekar et al. | |
| 2005/0232423 A1 | 10/2005 | Horvitz et al. | |
| 2006/0058612 A1 | 3/2006 | Dave et al. | |
| 2006/0141985 A1 * | 6/2006 | Patel et al. ..................... | 455/410 |
| 2006/0161554 A1 | 7/2006 | Lucovsky et al. | |
| 2007/0015521 A1 * | 1/2007 | Casey ......................... | 455/456.3 |
| 2007/0124781 A1 | 5/2007 | Casey et al. | |
| 2007/0180100 A1 | 8/2007 | Biggs et al. | |
| 2007/0214144 A1 * | 9/2007 | Lawson et al. ..................... | 707/9 |
| 2008/0127310 A1 * | 5/2008 | Robbins et al. .................... | 726/4 |
| 2008/0189301 A1 * | 8/2008 | Chen et al. .................... | 707/100 |

FOREIGN PATENT DOCUMENTS

WO   WO 00/36493   * 6/2000

OTHER PUBLICATIONS

Karjoth et al, Platform for Enterprise Privacy Practices: Privacy-enabled Management of Customer Data, Springer Verlag, 2002, 16 pages.*
"Arjis", available at least as early as Aug. 16, 2007, at <<http://www.justnet.org/training/nij2005/scanIon07.pdf>>, pp. 18.
"Data Sheet Sun Identity Management for Financial Services", at <<http://www.sun.com/software/products/identity/ds_identity_financial_svcs.pdf>>, Sun Microsystems, Inc., 2005, pp. 4.
DeSouza, "Comprehensive Activity Tracking and Change Auditing for Active Directory", at <<http://www.quest.com/Quest_Site_Assets/PDF/Datasheet_InTrustAD.pdf>>, Quest Software, Inc., 2006, pp. 2.
"iPolicy Security Manager", at <<http://www.ipolicynetworks.com/products/ism.html>>, iPolicy Networks Private Limited, 2006, pp. 3.

* cited by examiner

*Primary Examiner* — Diem Cao
(74) *Attorney, Agent, or Firm* — Lee & Hayes, PLLC

(57) ABSTRACT

Functionality is described for detecting an application's access to a user's information (or the application's request to access the user's information). The functionality sends a notification to the user which alerts the user to the access that has already taken place (or is pending approval). The functionality detects the current point of presence of the user, and based thereon, sends the notification to the user in an appropriate manner. Upon receipt of the notification, the user may optionally retrieve additional information regarding the application's access activity, modify the access rights of the application, and so on.

16 Claims, 7 Drawing Sheets

NOTIFYING A USER OF ACCESS TO INFORMATION BY AN APPLICATION

BACKGROUND

It is common today for users to store a variety of information in network-accessible storage. In the future, the scope and depth of information that users store in network-accessible storage is expected to increase dramatically. Such information can include contact lists, other user personal data, documents, images, songs, and so on. A user may occasionally wish to share parts of this information with others. For example, a user may wish to share contact information with a network-accessible application, e.g., so that various services provided by the application can be extended to the user's contacts. One way of manually performing this task is for the user to copy the information from storage and send this information to the application. Another way of performing this task is to grant the application permission to directly retrieve, now and in the future, the information from the storage on behalf of the user.

The latter scenario—in which an application is granted rights to retrieve a user's private information—is fraught with risks. In many cases, an application can be expected to behave as promised, e.g., by retrieving information from the user's storage for the narrowly focused purpose authorized by the user. In other cases, an application may retrieve information for other purposes that were not envisioned by the user. For example, the application may use the access rights granted by the user to "rummage around" in the user's storage for an extended period of time, perhaps mining the user's information for advertising purposes or some other self-serving end. In a potentially more dangerous scenario, the user may have granted the application access rights while controlled by a first entity, but the application has since been taken over by a second entity. The second entity may be a malicious actor which attempts to access the user's information for a purpose that is distinctly at odds with the interests of the user. In general, the ultimate risk presented by this type of access activity is that the user's personal information may be compromised.

SUMMARY

Functionality is described for detecting an application's access to a user's information (or the application's request to access the user's information). The functionality sends a notification to the user which alerts the user to the access that has already taken place (or is pending approval). The functionality detects the current point of presence of the user, and based thereon, sends the notification to the user in an appropriate manner. Upon receipt of the notification, the user may optionally retrieve additional information regarding the application's access activity, modify the access rights of the application, and so on.

Additional illustrative features are described in the following Detailed Description section.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth functionality for sending a notification to a user which alerts the user that a previously authorized application has accessed the user's information or seeks to access the user's information. The functionality can be manifested by various systems, apparatuses, modules, methods, computer-readable media, data structures, and other forms.

This disclosure includes the following sections. Section A describes an illustrative system for detecting access and for sending notifications. Section B describes illustrative procedures that explain the operation of the system of Section A. Section C describes illustrative user interface pages which allow a user to interact with the system of Section A.

A. Illustrative System

As a preliminary note, any of the functions described with reference to the figures can be implemented using software, firmware, hardware (e.g., fixed logic circuitry), manual processing, or a combination of these implementations. The term "logic, "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

A.1. Overview of System

Figure 1:
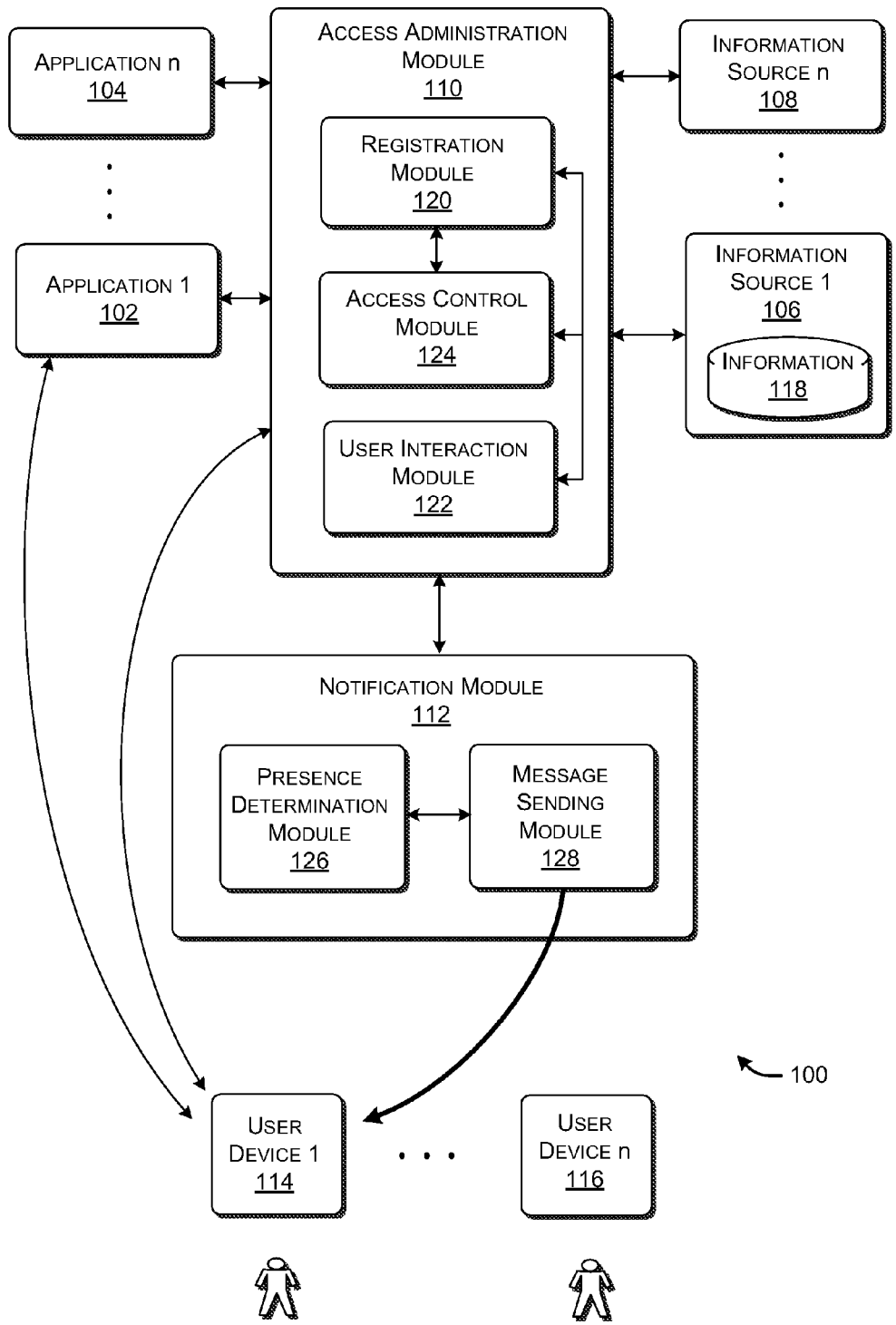
FIG. 1 shows an illustrative electronic data processing system for sending notifications to users.

FIG. 1 shows an illustrative electronic data processing system 100 for sending notifications to users. More specifically, the term "system" refers to all of the components within FIG. 1 or any subset thereof.

By way of overview, the system 100 includes one or more applications (102, . . . 104) for accessing information from one or more information sources (106, . . . 108). An access administration module 110 serves as the central agent for granting (and denying) access by the applications (102, . . . 104) to the information sources (106, . . . 108). A notification module 112 sends notifications to users when the applications (102, . . . 104) access information or when the applications (102, . . . 104) attempt to access information. The users receive these notifications at respective user devices (114, . . . 116). Based on these notifications, the users are alerted to the fact that the applications (102, . . . 104) have accessed their information or have attempted to access their information. The users can take various actions in response to these notifications. For example, the users may request additional information regarding the access activity, modify the access privileges of the applications, and so on. Each of these components will be addressed in turn.

As to the applications (102, . . . 104), an application may correspond to network-accessible functionality that provides a service to users. For example, an application can provide a commerce-related service (e.g., a shopping website), a gaming-related service, a social network-related service, an education-related service, a government-related service, and so on. In terms of physical implementation, an application's functionality can include one or more server computers, data storage devices, routers, and so forth, located at single site or distributed over plurality sites. A user can access and interact with a remote application by activating a network address associated with the application.

As to the information sources (106, . . . 108), an information source may represent a wide variety of repositories of information. Information source 106, for example, can represent a network-accessible service that stores user information in one or more information stores 118. A user may store any kind of information, such as a list of contacts, other user personal data, a collection of documents, a collection of image files, a collection of audio files, any kind of metadata, and so forth, or any combination thereof. In one case, a single user may store different types of information in different respective information sources (106, . . . 108). The information sources (106, . . . 108) can be administered by a single entity or by any combination of entities. In terms of physical implementation, an information source can include one or more server computers, data storage devices, routers, and so forth, located at single site or distributed over plurality sites. A user can access and interact with an information source by activating a network address associated with the information source.

The access administration module 110 coordinates an application's access to an information source. In one illustrative manner of operation, the access administration module 110 determines whether two conditions are satisfied before granting an application access to a user's information. First, the access administration module 110 determines whether the application has registered with the access administration module 110 to receive permission to access a particular information source. Second, the access administration module 110 determines whether the user has given the application the authority to access the user's information within the information source on an on-going basis. If these two conditions are satisfied, the access administration module 110 grants an application access to a user's information. To function as described, the access administration module 110 includes a registration module 120 and a user interaction module 122. The registration module 120 allows an application to register to gain access to a particular information source. The user interaction module 122, in optional cooperation with a particular application, allows a user to grant the application access to his or information within the information source.

The access administration module 110 also includes an access control module 124. The access control module 124 acts as a gatekeeper, either permitting or denying an application to access a user's information in a particular information source. In one case, the access control module 124 can grant access if: (a) the application has successfully registered to access a particular information source; (b) the user has granted the application access to his or her information; and (c) no other factors preclude or restrict access to the information.

The notification module 112 is communicatively coupled to the access control module 124. Through this communication connection, the access control module 124 can send an alert message when an application accesses a particular piece of the user's information or attempts to access the information. In response, the notification module 112 sends a notification to the user. In one case, the access administration module 110 and the notification module 112 can represent different respective systems, e.g., as potentially administered by two different entities. In another case, the access administration module 110 and the notification module 112 can represent components within a single system, e.g., as administered by a single entity.

More specifically, the notification module 112 includes two modules, a presence determination module 126 and a message sending module 128. The presence determination module 126 can be implemented by the notification module 112 itself or can represent a separate module which interacts with the notification module 112. The role of the presence determination module 126 is to determine the current point of presence of the user in the system 100. The current point of presence of the user represents the device and/or application through which the user is currently interacting with the system 100. For example, the user may be currently logged into an Email application, an Instant Messenger application, or other communication application of a personal computer device. Alternatively, the user may be currently using a mobile telephone, a personal digital assistant (PDA) device, a game console device, a set-top box device, and so on. All of these applications and devices correspond to different respective points of presence.

The message sending module 128 of the notification module 112 generates a notification to the user when it is alerted by the access control module 124 that an access has taken place (or that an access is requested). The message sending module 128 can be configured to generate the notification to best suit the current point of presence of the user. For example, if the user is currently logged into an Email application of a personal computer, the message sending module 128 will generate a first kind of notification. If the user is currently using a mobile telephone, the message sending module 128 will generate a second kind of notification, where the first kind of message may include more information than the second kind of message. After generating the message, the message sending module 128 sends the notification to the user through an appropriate communication route to an appropriate target destination (based on the user's current point of presence). For example, if the user is currently logged into an Instant Messaging application on her personal computer, the message sending module 128 may send the notification via broadband connection to the user's personal computer. If the user is currently using a mobile telephone, the message sending module 128 may send the notification via a gateway and over a wireless communication infrastructure. The notification can be sent as an SMS message or the like.

Preference information may also play a role in determining the manner in which a notification is generated and/or transmitted to a user. For example, the user may enter preference information that specifies that the user prefers to receive her notifications via Email rather than through an Instant Messaging interface. Thus, in those circumstances in which the user happens to be logged onto both an Email application and an Instant Messaging application, the messaging sending module 128 will honor the preference information by sending the notification to the user via the Email application.

The notification itself can include one or more fields of information. For instance, the notification can include a message which names the application that has either accessed the user's information or is attempting to access the user's information. The notification can also indicate what the application is attempting to do with the information, such as read the information, write to an information field, and so on. The notification can also provide other salient information about the access activity, such as additional information regarding the characteristics of the application making the access, information regarding the time at which the access has occurred (or will occur), information regarding prior access-related behavior exhibited by the particular application, and so forth. In addition, or alternatively, the notification can include a link that, upon activation, allows a user to receive any of the above items of information and/or additional information. For example, the user may activate such a link to access information regarding the privacy policy of the accessing application and deny the application any future access to that user's information.

The notification can also serve as a mechanism through which a user can take action with respect to the access activity. For example, the notification can provide a selectable field that a user can invoke to modify an application's access privileges in any way (such as, in one case, by revoking the privileges). In the scenario in which the access has not yet occurred, the notification can provide any kind of interactive mechanism that allows a user to approve or deny the access. In one case, the notification can embed the above-described types of selectable fields as part thereof; in another case, the notification can include a link which directs the user to one or more additional pages which provide the selectable fields.

By virtue of the notifications generated by the notification module 112, a user is timely informed of access activity regarding the user's information. This alerts the user to undesirable, unexpected, and/or suspicious activity by the application. The user can take timely action to mitigate any potential damage caused by the access activity.

Figure 2:
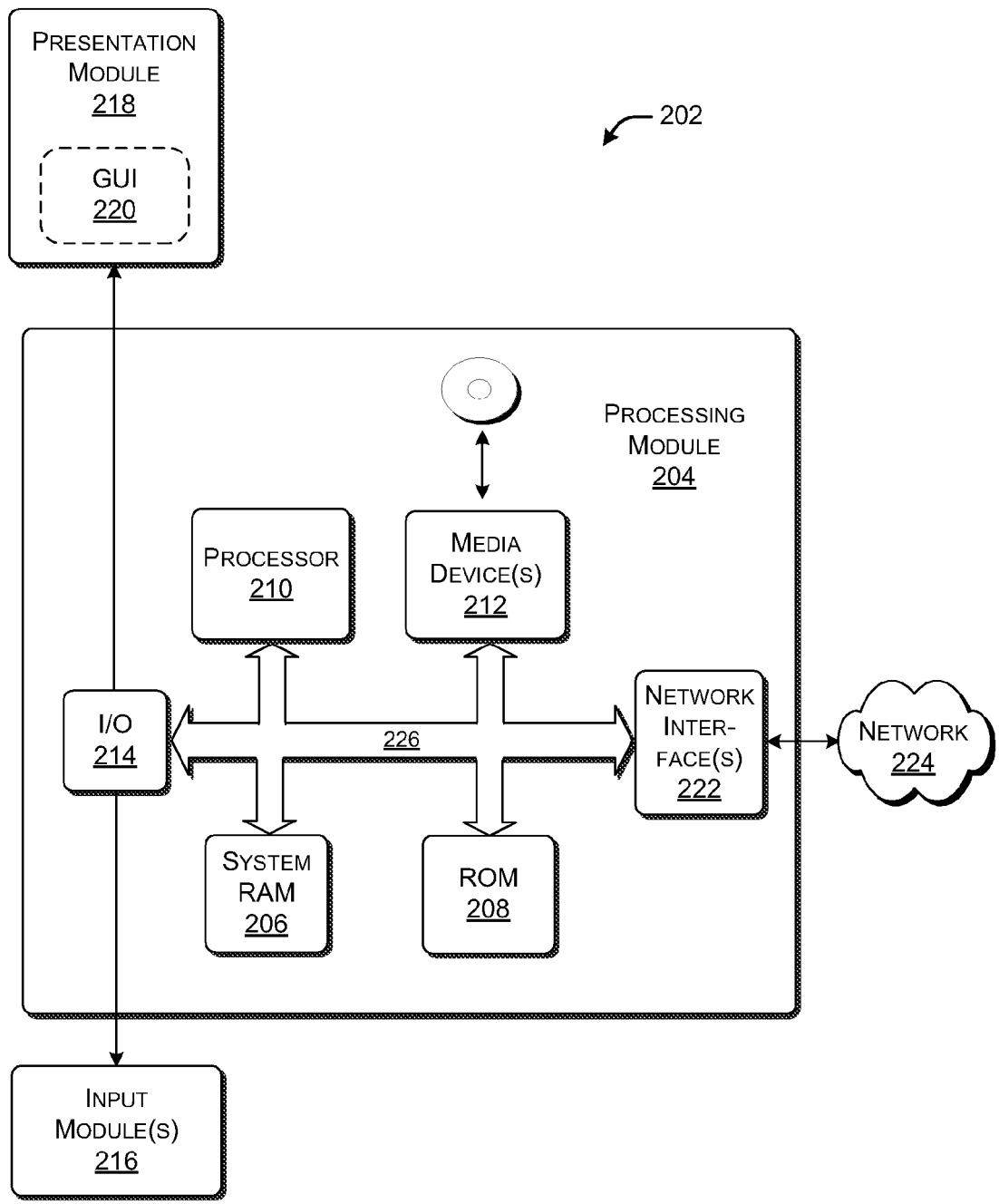
FIG. 2 shows illustrative processing functionality that can be used to implement any aspect of the system of FIG. 1.

FIG. 2 sets forth illustrative and generic processing functionality 202 that can be used to implement any aspect of system 100 shown in FIG. 1. In one non-limiting case, for instance, the processing functionality 202 may represent any computer machine used by the system 100, e.g., to implement any aspect of an application, any aspect of an information source, any aspect of the access administration module 110, any aspect of the notification module 112, and so on. The processing functionality 202 can also represent any data processing equipment used to implement any user device.

The processing functionality 202 can include a processing module 204 for implementing various processing functions. The processing module 204 can include volatile and non-volatile memory, such as RAM 206 and ROM 208, as well as one or more processors 210. The processing functionality 202 can perform various operations identified above when the processor(s) 210 executes instructions that are maintained by memory (e.g., 206, 208, or elsewhere). The processing functionality 202 also optionally includes various media devices 212, such as a hard disk module, an optical disk module, and so forth.

The processing functionality 202 also includes an input/output module 214 for receiving various inputs from the user (via input modules 216), and for providing various outputs to the user (via output modules). One particular output mechanism may include a presentation module 218 and an associated graphical user interface (GUI) 220. The processing functionality 202 can also include one or more network interfaces 222 for exchanging data with other devices via one or more communication conduits 224. One or more communication buses 226 communicatively couple the above-described components together.

The communication conduit 224 can represent a local area network (LAN), a wide area network (WAN) (e.g., the Internet), or some combination of LAN(s) and WAN(s). The conduit 224 can be implemented by any combination of wireless links, hardwired links, routers, gateways, name servers, and so forth (not shown), and can be governed by any protocol or combination of protocols. In one illustrative implementation, a user device can cooperate with the other components of the system 100 via the Internet as the conduit 224; any of the other components can interact with each over via LAN(s), WAN(s), point-to-point links, and so on.

B. Illustrative Procedures

Figure 3:
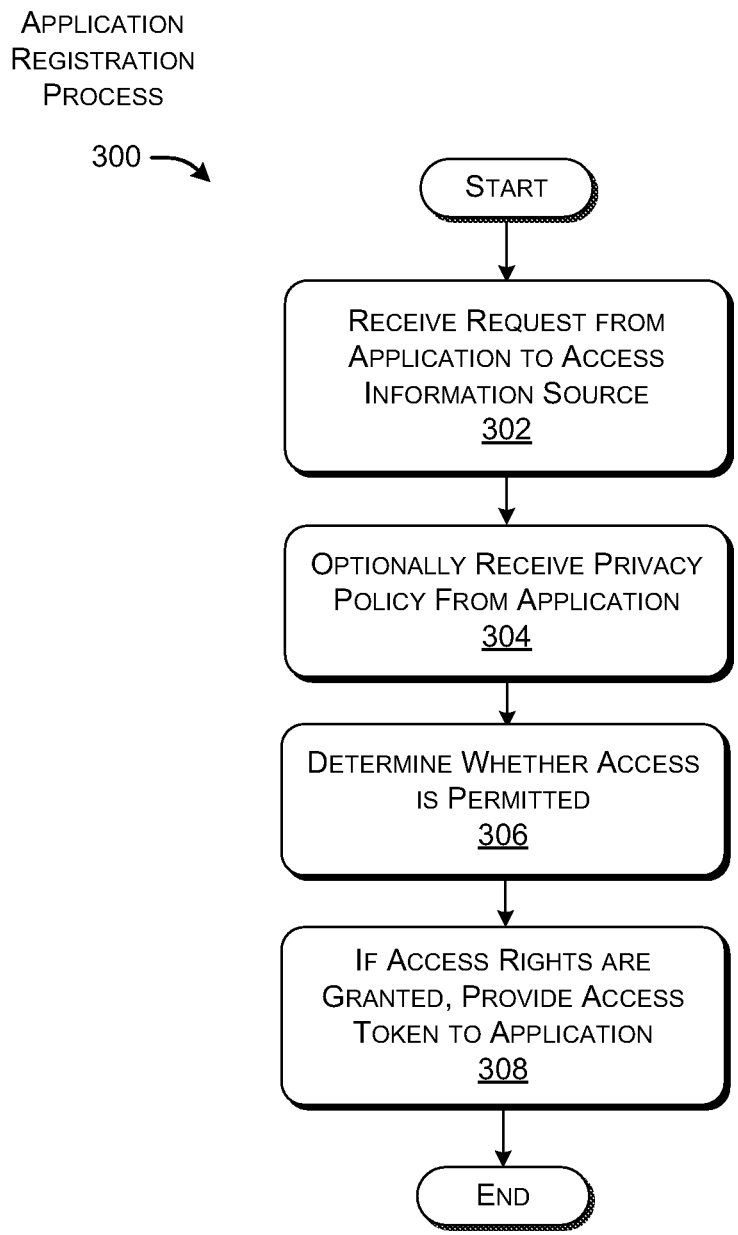
FIG. 3 is a flowchart that shows an illustrative procedure by which an application can register for the right to access information from an information source.
Figure 4:
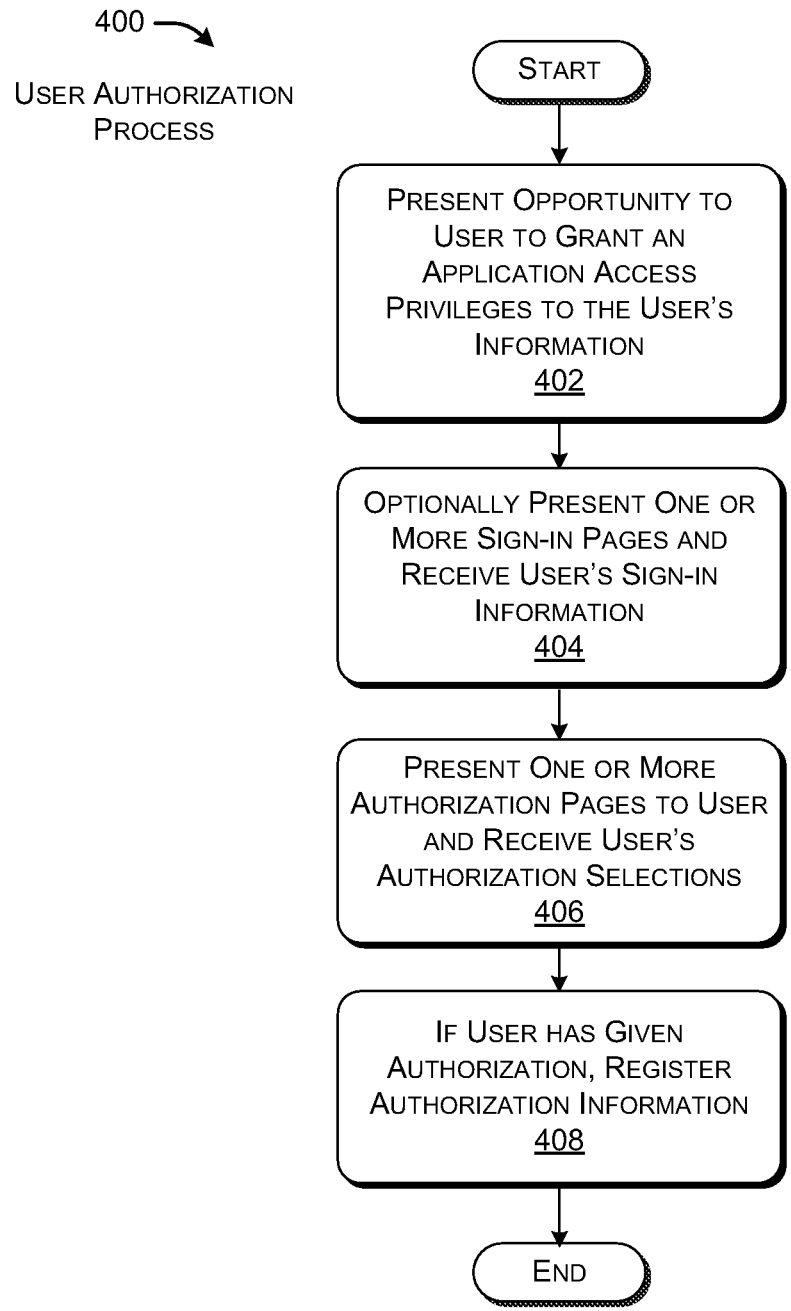
FIG. 4 is a flowchart that shows an illustrative procedure by which a user can authorize a registered application to access his or her information.
Figure 5:
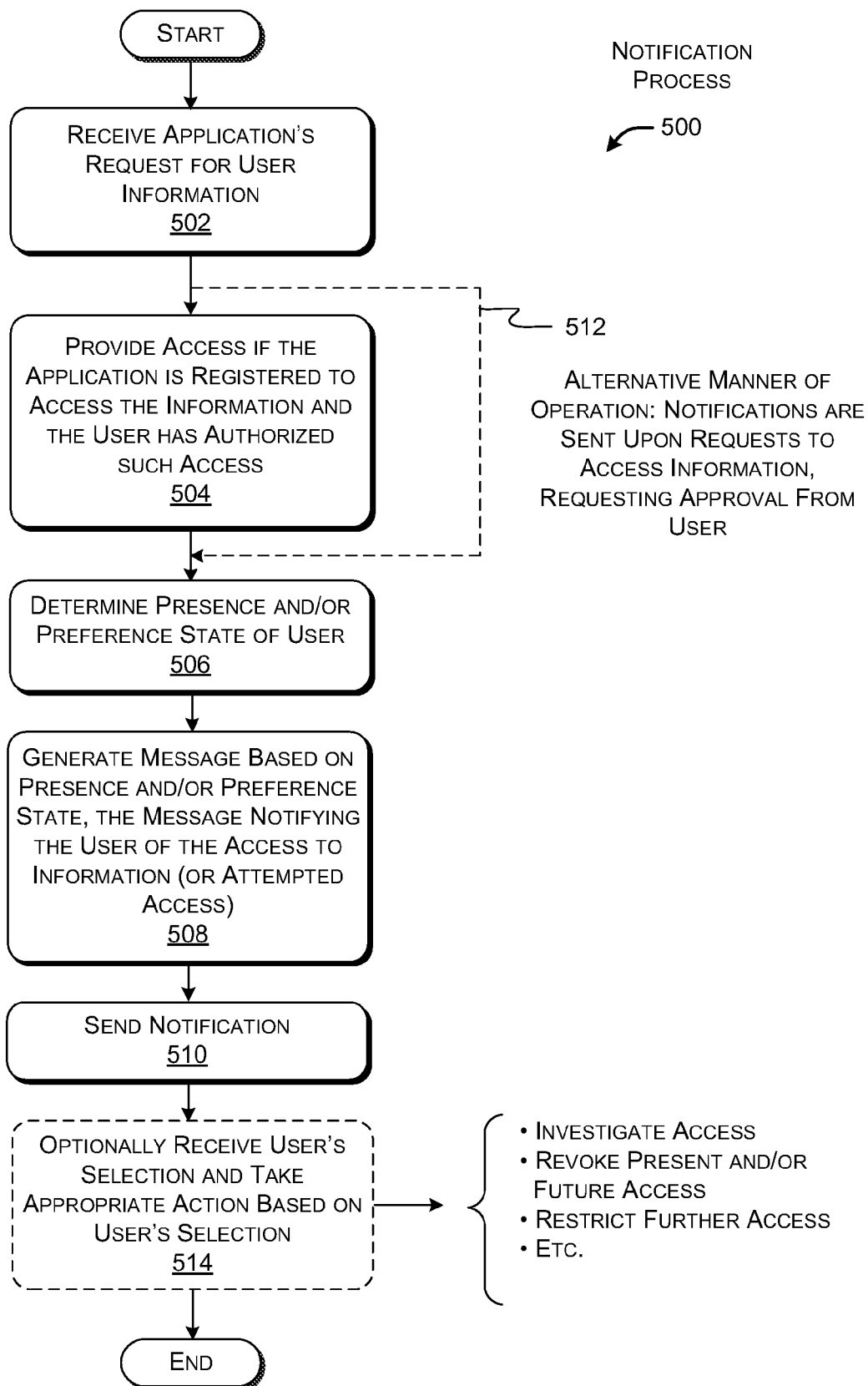
FIG. 5 is a flowchart that shows an illustrative procedure for processing an application's request for a user's information and for sending a notification to the user that alerts the user to the access.

FIGS. 3-5 show illustrative procedures which explain the operation of the system 100 in flow chart form. To facilitate discussion, certain operations are described as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on. Some of the functions described in the flowcharts have already been set forth in Section A; in these instances, Section B serves principally as a review of those functions.

To begin with, FIG. 3 shows an illustrative procedure 300 by which an application can register to access a particular information source. The procedure 300 is described from the perspective of the registration module 120 of the access administration module 110.

In block 302, the registration module 120 receives a request from an application. The application requests the access administration module 110 permission to access information from an identified information source.

In block 304, the registration module 120 optionally receives any information that is useful in making a decision whether to grant access. For example, the registration module 118 can receive a copy of the application's privacy policy. The privacy policy sets forth the terms and conditions under which an application will access information and/or use this information.

In block 306, the registration module 120 determines whether to grant access. The registration module 120 can rely on human analysis to make this determination, automated analysis (e.g., rules-based considerations), or a combination of manual and automated analysis.

In block 308, assuming that access is granted, the registration module 120 can provide an access token to the application. The access token can correspond to any information which the application can later use as verification that it has been granted access.

FIG. 4 shows an illustrative procedure 400 by which a user can grant permission to an application to access the user's information stored in an information source. In one case, as will be explained more fully in the next section, the use may grant such access in the course of interacting with the application. Thus, parts of the procedure 400 can be implemented by the application and other parts can be implemented by the access administration module 110.

In block 402, an application can present an opportunity for a user to grant the application access to the user's information. There are many examples of this operation. To name one, an application can represent a commerce-related site that allows a user to purchase media items over the Internet. The application can provide an interface which invites the user to provide a list of the user's contacts so that the application can alert these contacts to the user's purchases, item reviews, etc. The presumption here is that the user may wish to share this information with his or her friends as suggestions, with the expectation that some of these individuals will do the same in return. The user's response to an invitation to share such information initiates a set-up procedure.

In block 404, as a first part of the set-up procedure, one or more entities in the system 100 can ask the user to enter password information or other access codes. For example, a service associated with an information source that will be accessed may ask the user to sign into the service by entering password information.

In block 406, the user interaction module 122 of the access administration module 110 can ask the user to verify that he or she wishes to share information from a particular information source with the application.

In block 408, presuming that the user grants authorization, the access administration module 110 can store authorization information. The authorization information, together with the access token that has been previously provided to an application, entitles the application to access the user's information from an information source.

FIG. 5 shows an illustrative procedure 500 by which the access administration module 110 and the notification module 112 regulate access to information and generate notifications to a user when information has been accessed (or when an application requests to access the information). The procedure 500 is set forth from the standpoint of the access administration module 110 and the notification module 112.

In block 502, the access control module 124 of the access administration module 110 receives an application's request to access information associated with a user from an identified information source.

In block 504, the access control module 124 grants access if the application has previously registered for the privilege to access the information (as per the procedure 300 of FIG. 3) and the user has previously authorized the application to access his or her information (as per the procedure 400 of FIG. 4). The access control module 124 can optionally apply additional rules to determine whether to grant access to the user's information.

In block 506, in preparation for sending a notification to the user, the presence determination module 126 can determine the user's current point of presence in the system 100. The user's current of presence corresponds to the application and/or device that the user is currently using to interact with the system 100.

In block 508, the message sending module 128 generates a notification to a user that notifies the user of the access activity. In this operation, the notification informs the user that access has already taken place. The message sending module 128 can generate a notification that is best suited for the current point of presence of the user (as detected in operation 506).

In block 510, the message sending module 128 transmits the message to the user at the user's current point of presence in the system 100. The notification alerts the user to the fact that access has already taken place. As indicated above, the notification can provide other information regarding the access, such as the name of the application making the access, the time of the access, the prior access behavior of the application, and so on. In an alternative scenario, as represented by the dashed line 512, the notification alerts the user to the fact that the application has requested access but has not yet made access (as access is contingent on the approval of the user).

In one case, the message sending module 128 can send the notification to the user in substantially real-time manner, for example, in direct response to the access activity and soon after the access activity. In another case, the message sending module 128 can send the notification to the user in a non-real-time manner. For example, the message sending module 128 can send one or more notifications at periodic times (such as every half hour, etc.) corresponding to access activity that has occurred in that half hour time frame. In another case, the message sending module 128 can send a notification to a user in an on-demand manner, that is, upon request from the user (or other entity). Still other timing considerations can be used to govern the sending of notifications.

In block 514, the user optionally takes some action in response to the notification, such as by revoking or otherwise modifying the access privileges of the application. The user can also discover additional information regarding the application, the information being accessed, and so on.

C. Illustrative User Interface Presentation

Figure 6:
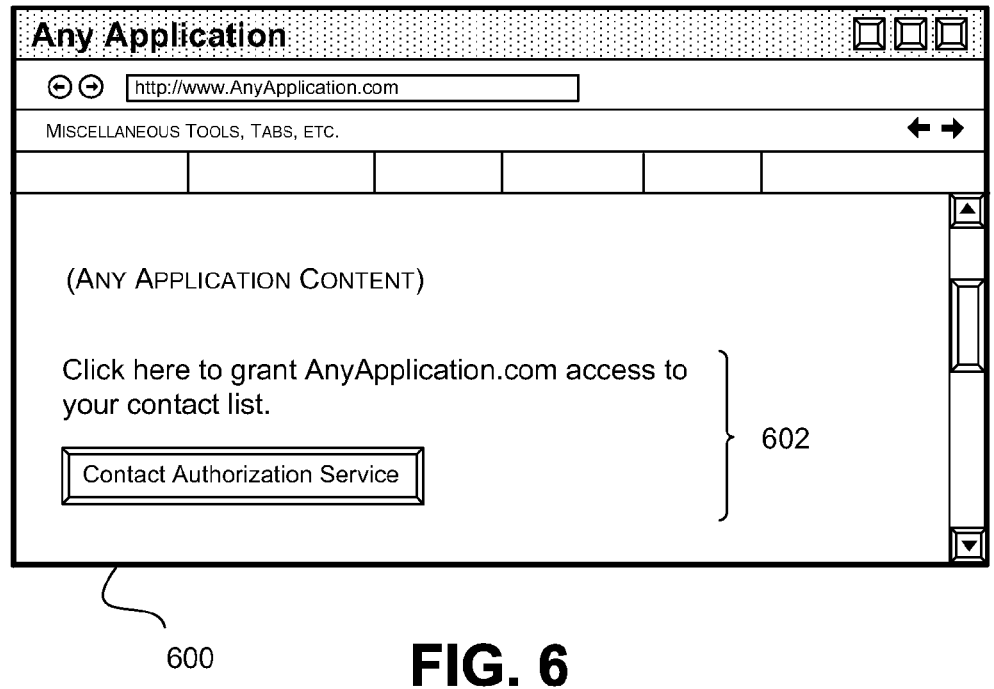
FIG. 6 is an illustrative user interface page provided by an application which invites the user to grant an application the right to access his or her information.
Figure 7:
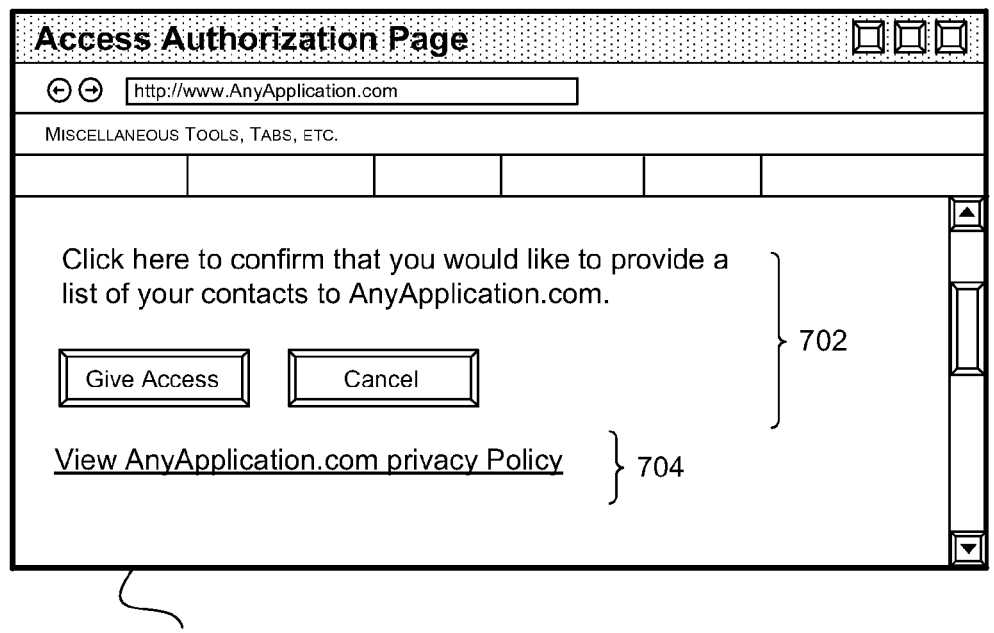
FIG. 7 is an illustrative user interface page that allows the user to grant an application the right to access his or her information.
Figure 8:
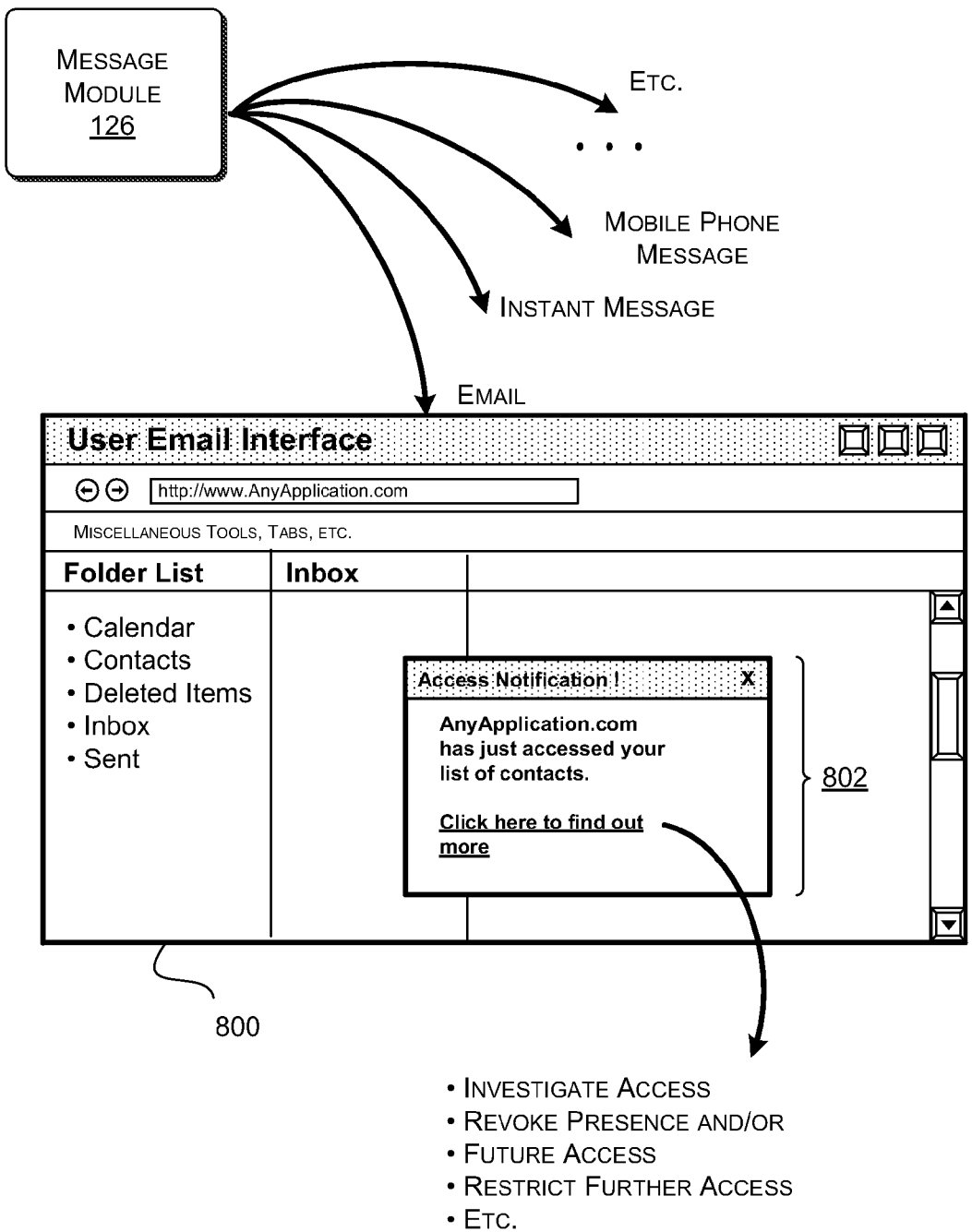
FIG. 8 is an illustrative notification that is received in the context of an Email user interface page.

FIGS. 6-8 show different illustrative user interface pages through which the user may interact with the system 100 in different stages of the procedures described above. Different actors in the system 100 can furnish these pages.

FIG. 6 shows a user interface page 600 that invites a user to share information with an application. In one illustrative case, the application may furnish this page 600 to the user at an appropriate juncture. The page 600 includes a prompt 602 which invites the user to share information. In this case, the prompt 602 comprises a text message and a control that can be activated to initiate an information-sharing set-up procedure.

FIG. 7 shows a user interface page 700 that is presented when the user activates the control in FIG. 6. In one illustrative implementation, the access administration module 110 can furnish this page 600 to the user. (In an alternative implementation, one or more other pages may be presented to the user which precede page 600; these other pages may ask the user to sign into the service associated with the information source to be accessed). The page 700 includes a prompt which asks the user to confirm whether he or she wishes to share information with the application. The page 700 can also include a prompt 704 which invites the user to receive additional information regarding the application prior to granting access privileges to the application. For example, the prompt 704 can be invoked to view the privacy policy of the application.

FIG. 8 shows a user interface page 800 for presenting a notification 802 to the user. In this illustrative case, the notification 802 is presented to the user in the context of an Email application page (because the user is currently logged into an Email application on a computer and thus the Email application corresponds to the user's current point of presence). The notification 802 itself can include any combination of informational content, any combination of functional (e.g., interactive) features, and can adopt any look and feel. The notification may differ, in part, based on the user's current point of presence.

In the illustrate example of FIG. 8, the notification 802 alerts to the user to the fact that an application named "AnyApplication.com" has just accessed the user's contact list. The notification 802 includes a prompt that allows a user to find out more information regarding the access and/or to modify the access privileges of this application. In the alternative case (not shown) in which access has not taken place and is contingent on the user's approval, the notification can ask the user to approve or deny the application's access to the user's information.

In closing, a number of features were described herein by first identifying illustrative problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as illustrative forms of implementing the claimed invention.

What is claimed is:

1. A method implemented by an electronic data processing system for providing a notification, comprising:
    detecting that an application has accessed information associated with a user, the application previously having received an authorization from the user to access the information;
    in response to detecting that the application has accessed the information associated with the user, generating a notification that alerts the user regarding the application accessing the information associated with the user, the notification providing a control that allows the user to modify an access privilege of the application;
    determining a current point of presence of the user, the current point of presence of the user representing an application through which the user is currently interacting with the electronic data processing system, wherein the notification that is generated is compatible with the current point of presence of the user; and
    sending the notification to the user at the current point of presence of the user.

2. The method of claim 1, further comprising:
    receiving a request from the user to perform an action after sending the notification to the user, and
    performing the action.

3. The method of claim 2, wherein the action comprises modification of a right of the application to access the information.

4. The method of claim 2, wherein the action comprises revocation of a right of the application to access the information.

5. The method of claim 2, wherein the action comprises providing the user additional information regarding the application accessing the information associated with the user.

6. One or more computing devices, comprising:
    one or more processors; and
    memory to store computer-executable instructions that, when executed by the one or more processors, perform the method of claim 1.

7. The method of claim 1, wherein the control comprises a selectable field that allows the user to modify the access privilege of the application.

8. An electronic data processing system for providing a notification, comprising:
    a processor;
    memory;
    an access administration module stored in the memory and executable on the processor that is configured to detect that an application has engaged in access activity of information associated with a user, the application previously having received an authorization from the user to access the information;
    a presence determination module configured to determine a current point of presence of the user; and
    a notification module stored in the memory and executable on the processor that is configured to:
    generate a notification that alerts the user regarding the access activity of-reading the information associated with the user in response to detecting that the application has engaged in the access activity of reading the information associated with the user by the access administration module, the notification being compatible with the current point of presence of the user and providing a control that allows the user to modify an access privilege of the application, and
    send the notification to the user at the current point of presence of the user.

9. The electronic data processing system of claim 8, wherein the access administration module further includes a registration module configured to establish a right of the application to access information from an information source.

10. The electronic data processing system of claim 8, wherein the access administration module further includes a user interaction module configured to receive an authorization from the user for the application to access the information.

11. The electronic data processing system of claim 8, wherein the access administration module further includes a user interaction module configured to receive a request from the user to perform an action after the notification has been sent to the user.

12. The electronic data processing system of claim 11, wherein the action comprises modification of a right of the application to access the information.

13. The electronic data processing system of claim 11, wherein the action comprises providing the user additional information regarding the access activity.

14. The electronic data processing system of claim 8, wherein the control comprises a selectable field that allows the user to modify the access privilege of the application.

15. A system, comprising:
    a processor;
    memory;
    a presence module stored in the memory and executable on the processor that is configured to determine a current point of presence of a user, the current point of presence of the user representing an application through which the user is currently interacting with the system; and a message module stored in the memory and executable on the processor that is configured to:

receive an indication that a network-accessible application is accessing information associated with a user, wherein the user has previously granted the network-accessible application a right to access the information; and send a notification to the current point of presence of the user in response to receiving the indication that the network-accessible application is accessing the information associated with the user, the notification being compatible with the current point of presence of the user, wherein the notification alerts the user regarding the application accessing the information associated with the user and provides a control that allows the user to modify an access privilege of the network-accessible application.

16. The system as recited in claim 15, wherein the control provides a selectable field that allows the user to modify the access privilege of the application.

* * * * *